United States Patent [19]

London

[11] Patent Number: 4,720,291

[45] Date of Patent: Jan. 19, 1988

[54] AERO-HYDRAULIC POLLUTION CONTROL SYSTEM

[76] Inventor: Ilya Z. London, 72 Vogel St., Boston, Mass. 02132

[21] Appl. No.: 929,917

[22] Filed: Nov. 12, 1986

[51] Int. Cl.⁴ .......................................... B01D 47/02
[52] U.S. Cl. ...................................... 55/227; 55/229; 55/239; 55/245; 55/249
[58] Field of Search .................. 55/216, 219, 227–229, 55/239, 240, 244, 245, 249

[56] References Cited

U.S. PATENT DOCUMENTS

| | | | |
|---|---|---|---|
| 1,324,236 | 12/1919 | Ehrhart | 55/229 X |
| 2,373,330 | 4/1945 | Nutting | 183/24 |
| 2,403,545 | 7/1946 | Nutting | 55/249 X |
| 2,546,259 | 3/1951 | Fenn | 55/240 X |
| 2,873,816 | 2/1959 | Umbricht et al. | 55/229 X |
| 2,931,459 | 4/1960 | Wiles et al. | 55/249 X |
| 3,063,221 | 11/1962 | Ortgies et al. | 55/229 |
| 3,385,032 | 5/1968 | Crabbé | 55/249 |
| 3,433,146 | 3/1969 | Russell | 55/434 X |
| 3,481,115 | 12/1969 | Brandt | 55/228 X |
| 3,494,108 | 2/1970 | Moragne | 55/227 |
| 3,624,696 | 11/1971 | Cohen | 55/223 |
| 3,731,462 | 5/1973 | Castarella | 55/228 |
| 3,738,627 | 6/1973 | Scotchmur | 55/227 X |
| 3,789,109 | 1/1974 | Lyon et al. | 55/249 X |
| 3,789,586 | 2/1974 | Arnold et al. | 55/228 |
| 3,810,349 | 5/1974 | Rebours | 55/239 X |
| 3,841,062 | 10/1974 | Molitor et al. | 55/244 X |
| 3,876,399 | 4/1975 | Saponaro | 55/228 |
| 3,920,425 | 11/1975 | Grantham | 55/228 X |
| 3,971,642 | 7/1976 | Perez | 55/227 X |
| 4,124,021 | 11/1978 | Molitor | 55/228 X |
| 4,193,967 | 3/1980 | Black | 55/229 X |
| 4,227,895 | 10/1980 | Boon | 55/228 X |
| 4,281,635 | 8/1981 | Gaylord | 55/DIG. 36 |
| 4,283,999 | 8/1981 | Kearney | 55/228 X |
| 4,290,784 | 9/1981 | Rawicki | 55/228 X |
| 4,295,866 | 10/1981 | Kearney | 55/240 X |
| 4,323,371 | 4/1982 | Ritranen | 55/228 X |

FOREIGN PATENT DOCUMENTS

| | | |
|---|---|---|
| 2731872 | 4/1978 | Fed. Rep. of Germany ........ 55/227 |
| 174938 | 11/1965 | U.S.S.R. . |
| 185196 | 10/1966 | U.S.S.R. . |
| 514166 | 6/1976 | U.S.S.R. ................................. 55/228 |
| 573175 | 9/1977 | U.S.S.R. ................................. 55/228 |

Primary Examiner—Robert Spitzer

[57] ABSTRACT

A self-contained wet type pumpless gas pollution control and sludge-handling system, applicable for dusts, vapors, aerosols, mists and fumes, comprises the open-to-the-atmosphere liquid pollutant extractor (17) hydraulically interconnected with the gas pollutant extractor (28). The system makes use of the aerodynamic force of the exhaust fan to circulate a waterfall contaminant capture system and accumulate floats in the extractor (17) available for removal at any time. The unique concept of the open and easily accessible liquid pollutant extractor provides various types of the hydraulically automated floats removal at any time, avoiding a drainage of the system, i.e. preventing a water pollution. The diffusion control feature originates an operating liquid level, prevents and supresses fire, and provides a static pressure feedback control to stabilize a desired amount of the gas flow in spite of unexpected fluctuations of the flow resistance in the exhaust system. The original feature of the invention assists to cool exhaust gases and enables a heat recovery from the working liquid. The invention can be used for a dual purpose as an air pollution control and as an element of a technological process, where pollutant soluble in a liquid creates a new product.

15 Claims, 15 Drawing Figures

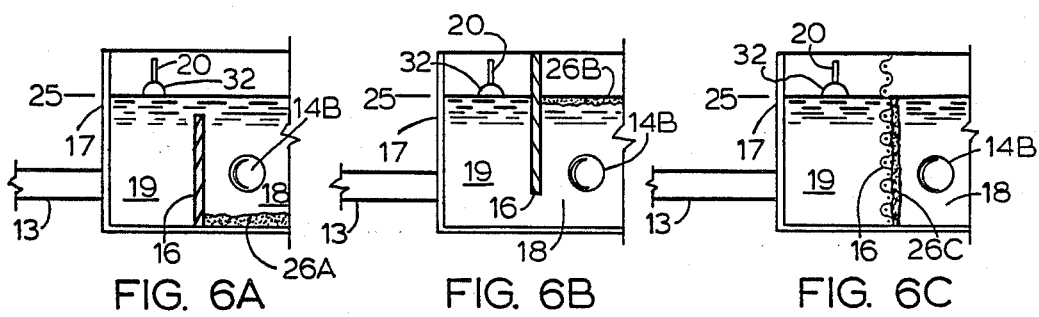
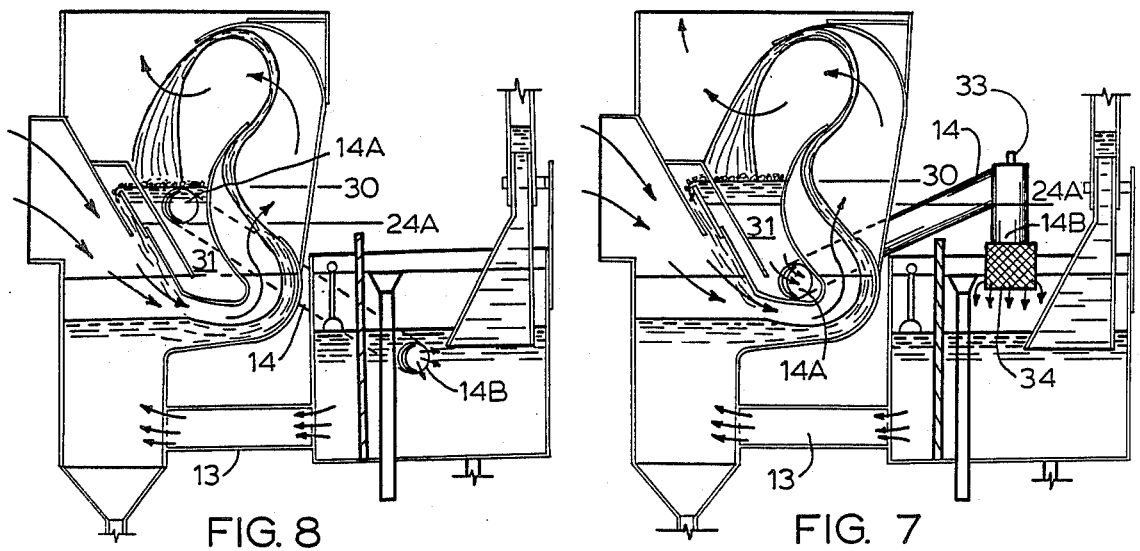
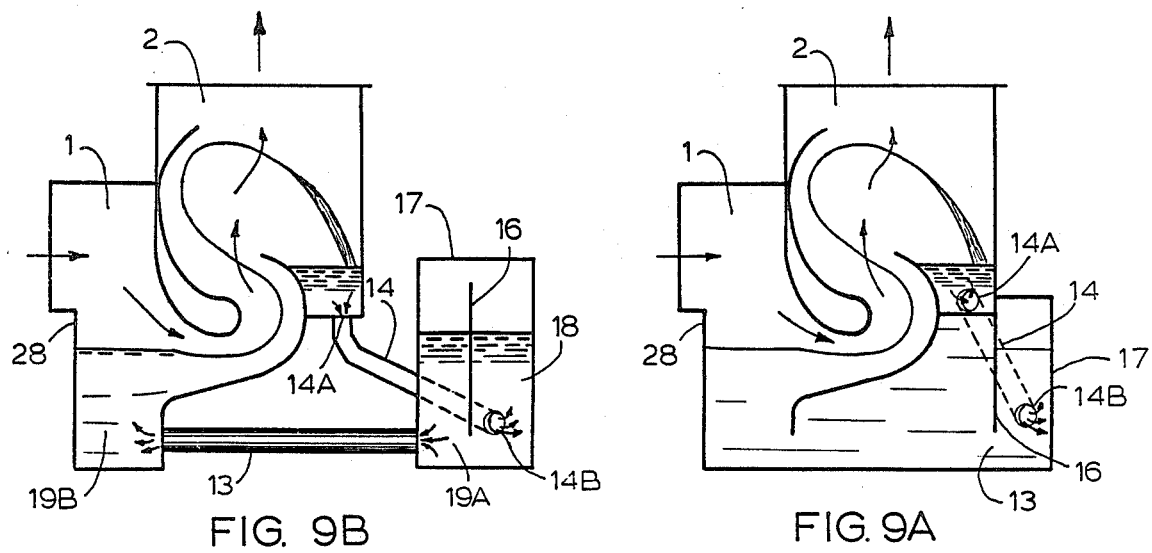

AERO-HYDRAULIC POLLUTION CONTROL SYSTEM

BACKGROUND

1. Field of the Invention

This invention relates to Air Pollution Control Systems, specifically to Wet Type Dust Arresters.

2. Description of Prior Art

There are presently available a number of other dust arresters wherein gas passes downwardly through the inlet gas side of the arrester and impinges against a liquid bath as it turns to pass upwardly through a baffle zone at a rate depending upon the velocity of the gas and the "head" of liquid available in the impingement area.

I am an author of the inventions: the Bubble-Vortical Dust Arrester, USSR Author's Certificates No. 174,938 dated Feb. 15, 1964 and No. 185,196 dated May 31, 1966. The submitted new invention—the Aero-Hydraulic Pollution Control System—is an improvement of the above-mentioned inventions. In spite of the Bubble-Vortical Dust Arrester have had extremely successful applications still it has several objections:

First is the absence of an open-to-the-atmosphere liquid pollutant extractor with pipes connecting to an gas pollutant extractor.

Second is the absence of gas flow originated prewashing of the polluted gas upon entry to the gas pollutant extractor before gas impinges against liquid bath. As result, this decreases the effect of centrifugal forces acting on the particles.

Third is the absence of a high operating liquid level control inside the intermediate collector.

Fourth is the absence of a hydraulically automated drain of pollutant floats.

Fifth is the absence of the diffusion control, peculiar for my invention, which constitutes a hydraulic trap, preventing a diffusion of gases and causing a flame suppression in unoperating time, and originates a desirable low operating liquid level, not imposing an additional gas resistance. The Bubble-Vortical Dust Arrester can not support these conditions without raising a static liquid level and, then, causing an additional gas resistance.

Sixth, the liquid pollutant extractor is not furnished with suitable types of partitions for pollutants with different properties.

Seventh, it lacks the option of disconnecting and elevating the polluted liquid passage end at the liquid pollutant extractor. This option could provide a free gravitational liquid flow discharge.

Another such advanced device—the Air Cleaner, U.S. Pat. No. 2,373,330, dated Apr. 10, 1945—has not been entirely satisfactory for a number of reasons. The Air Cleaner is less advanced even than the Bubble-Vortical Dust Arrester. Due to its particular feature the Air Cleaner is deprived of several expedient elements.

Thus, the Air Cleaner has not been used for floating dust such as grease-laden cooking vapors, residues, paint aerosol, textile dust, etc. The pollutants float up on a surface of liquid and cannot be removed from the confined space, unless, firstly, the Air Cleaner operation is off, and, secondly, all the liquid is drained from the reservoir. This is a significant amount of polluted liquid which could create a water pollution problem.

Another objection is regarding the liquid clarifying from pollutants. The liquid flow in the reservoir is very turbulent, therefore it impedes with settling down of a heavy dust and collecting a light dust or grease on the surface of the liquid. As a result, the polluted liquid is returned for the next gas cleaning cycle.

The next objection is the particular necessity for the Air Cleaner operation to have a predetermined static liquid level desirable for the operational effect only. It does not provide a flame suppression and does not prevent a diffusion of gases through the Air Cleaner and exhaust ducts to the atmosphere when the Air Cleaner is not in operation. To provide these conditions would require raising the static liquid level, which would cause an additional gas resistance. These problems arise because of an absence of the diffusion control peculiar to my invention.

The Air Cleaner has not been equipped with several devices, which are peculiar for my invention, such as:

an open-to-the-atmosphere liquid pollutant extractor, which is hydraulically interconnected with the Air Cleaner, hydraulically automated pollutant floats removal, originated by gas flow, prewashing of the polluted gas upon entry to the Arrester before it impinges against liquid bath. As result, this decreases the effect of centrifugal forces acting on the pollutant particles.

flexible mounting layout, significantly smaller overall dimensions for an equal amount of gas exhausted, as a result of using an internal space of the upper guide for intermediate collecting a polluted liquid, which comes after the gas cleaning cycle.

Objects and Advantages of the Present Invention

Accordingly I claim the following as my objects and advantages of the invention:

to provide a highly efficient system for gas and liquid pollution control with a wide field of utilization, comprehensive range of operation at minimal maintenance and operational costs. For instance, the system will work with different kinds of dusts, gases, aerosols, and vapors of acids, oils, tars, resins etc. The working liquid can be water, oil, alkali and different chemical and physical solutions. Because the working liquid is continually reused, its consumption is negligible. In addition, the system can be any size to handle a practically possible amount of polluted gas.

to provide a reliable and durable system based exclusively on the Aero-Hydro-Dynamic Principles without any moving or removing parts, and with an open-to-the-atmosphere and easy accessible liquid pollutant extractor.

to provide a system which can be used as an element of a technology line performing simultaneously gas cleaning and utilizing the entrapped matter in a technological process. For instance, the entrapped sugar or soap dust can be turned into a syrup or soap liquid with a desirable concentration of the solution.

to provide a simple in operation system which requires a minimum of skill and training to use. To operate the system is to only push the button "ON" or "OFF".

In addition I claim the following additional objects and advantages:

to provide the system which avoids the tendency of many dust arresters to become clogged since there are no spaces in the system where dust, grease or lint can collect and restrict the gas flow.

to provide an exclusive, suited to properties of pollutants hydraulically operated floats removal procedure, which does not require the entire drainage of the system. In addition, this serves as the emergency overflow, to provide an exclusive and simple way to convert a floating pollutant, for instance paint aerosol, into pressed foam mats. It makes easy to remove and dispose it, to prevent any kind of entrapped dust, grease or lint from reentering the gas pollutant extractor by means of the quiet, laminar liquid stream in the liquid pollutant extractor for adequate separating of dust and grease from the liquid before it returns for next cycle.

causing a flame suppression and preventing a diffusion of gases through the gas pollutant extractor and exhaust ducts to atmosphere (when the system is not operating) not by means of airlocking mechanical device, but by means of the hydraulically structured adjustable diffusion control, which originates a low operating liquid level and does not impose an additional gas resistance when the system is operating.

to provide the clarified liquid passage by means of piping, interconnecting the gas pollutant extractor and the liquid pollutant extractor, which allows a flexible mounting layout (relatively to each other), or connecting several dust arresters to one liquid pollutant extractor and vice versa.

implementing a gas flow originated prewash for the polluted gas upon entry to the gas pollutant extractor before the gas impinges against liquid bath. The entrapped particles are thoroughly wetted, thereby adding to their mass. This increases the effect of centrifugal forces acting on the particles and causes them to penetrate the liquid film and precipitate out of the gas stream, implementing the mechanically adjustable device in the intermediate collector. The device allows to control a high operating liquid level and a prewash of the polluted gas, implementing types of partitions in the liquid pollutant extractor suitable to properties of pollutants, aspecially to their specific weights, assisting to cool exhaust gases and enabling a heat recovery from a working liquid, to provide different options of connecting the polluted liquid passage to the gas pollutant extractor and the liquid pollutant extractor:

*placing the polluted liquid passage connection to the gas pollutant extractor on various horizontal levels can provide the hydraulic trap in the intermediate collector preventing the diffusion of vapors or flame through the exhaust ducts to atmosphere (when the system is not operating). In addition the arrangement enables to achieve a desirable dynamic liquid level in the intermediate collector to provide overflow for prewashing. This replaces the function of the adjustable device in an overflow passage of the intermediate collector.

*disconnecting the polluted liquid passage from the liquid pollutant extractor and elevating it on a desirable level above the dynamic liquid level in the liquid pollutant extractor can provide an open gravitational flow of the polluted liquid. If this end is equipped with a desirable type of filter, some kind of pollutants will be extracted before they reach the liquid pollutant extractor. In addition this provides a hydraulic trap in the intermediate collector. In the case, another end of the passage to be connected at the lowest level of the intermediate collector.

DRAWING FIGURES

FIGS. 3a, 3b, 3c and 3d show a cross-sectional view of the hydraulically operated pollutant floats removal details 12 and 12a in the liquid pollutant extractor 17.

Figure 4:
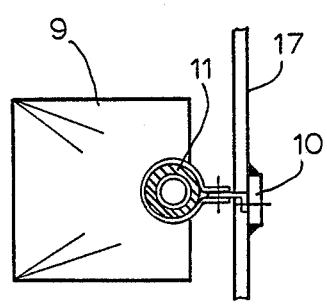

FIG. 4 shows a top-sectional view of the diffusion control : the compensating liquid hood 9, gas static pressure tube 11, and support 10, in the liquid pollutant extractor 17.

Figure 5:
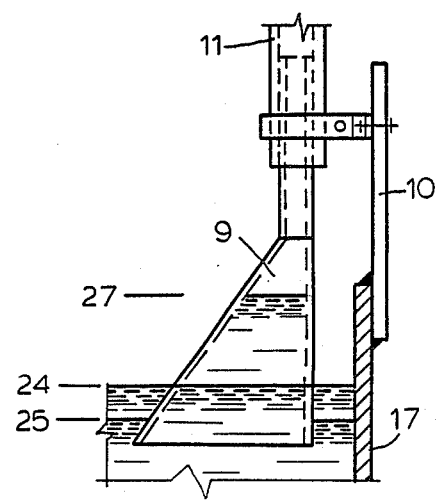

FIG. 5 shows a cross-sectional view of the diffusion control in the liquid pollutant extractor 17.

FIGS. 6a, 6b and 6c show a cross-sectional views of different applications of the partitions in the liquid pollutant extractor 17.

FIG. 7 shows a cross-sectional view of the entire Aero-Hydraulic Pollution Control System illustrating a purification procedure with an option of elevating 14b on a desirable level above the operating liquid level in the liquid pollutant extractor 17 for an open gravitational flow of the polluted liquid.

FIG. 8 shows a cross-sectional view of the entire Aero-Hydraulic Pollution Control System illustrating a purification procedure with an option of elevating 14a on a desirable level in the intermediate collector 31 for creating a hydraulic trap.

FIGS. 9a and 9b show a cross-sectional views of applications of the present invention for the Air Cleaner (U.S. Pat. No. 2,373,330).

DRAWING REFERENCE NUMERALS

1: gas intake
2: gas exit
3: partition in 31
4: adjustable guide in 31
5: adjustable connection of 4 and 7
6: first guide of 21
7: second guide of 21
8: third guide of 21
9: liquid compensating hood in 17
10: support of 9
11: gas static pressure tube
12: adjustable floats drain in 17
12a: floats receiver
13: clarified liquid circulating passage from 17 to 28
14: polluted liquid circulating passage from 31 to 18
14a: exit of the polluted liquid from 31
14b: entrance of the polluted liquid to 18
15: manual valved drain of 17 and 28
16: adjustable partition in 17
17: liquid pollutant extractor
18: polluted liquid compartment in 17
19a: clarified liquid compartment in 17
19b: clarified liquid compartment in 28
20: make-up liquid piping connection
21: gas scrubbing chamber in 28
23: floats drainage level in 18
24: static liquid level in 17 and 28

Figure 3A:
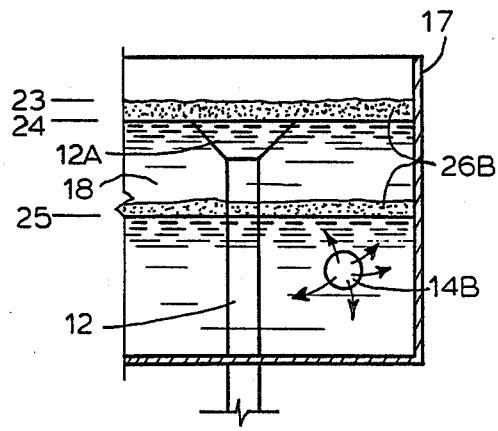
Figure 3B:
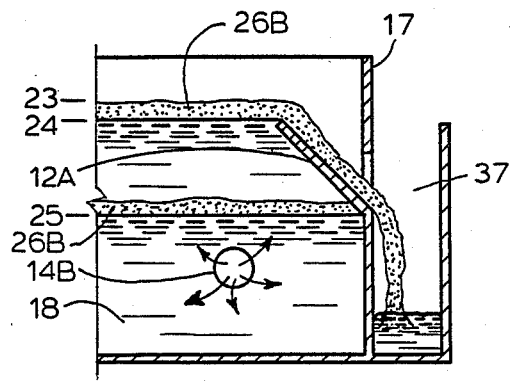
Figure 3C:
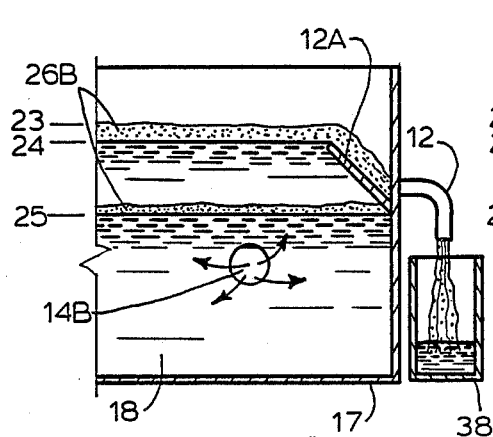
Figure 3D:
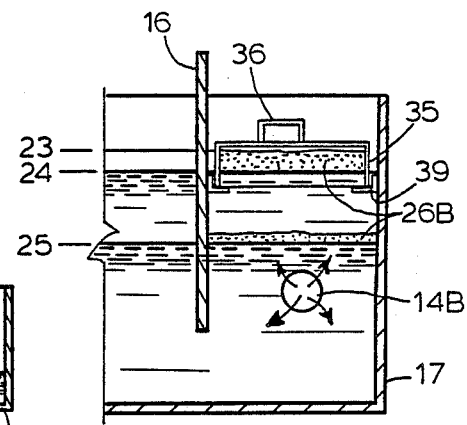

24a: static liquid level in 31 of 28
25: low operating liquid level in 17
26a: settling pollutants in 18
26b: emerging pollutants in 18
26c: floating pollutants in 18
27: high operating liquid level in 9
28: gas pollutant extractor
29: low operating liquid level in 28
30: high operating liquid level in 28
31: intermediate collector of polluted liquid in 28
32: make-up liquid float valve in 19a
33: gas vent of 14 on FIG. 7
34: liquid filter of 14 on FIG. 7
35: floats compactor on FIG. 3d
36: handles of 35
37: disposal compartment of 17 on FIG. 3b
38: disposal can on FIG. 3c
39: supporting frame on FIG. 3d

AERO-HYDRAULIC POLLUTION CONTROL SYSTEM—DESCRIPTION

The Aero-Hydraulic Pollution Control System (FIG. 1 and 2) consists of two hydraulically interconnected units: the gas pollutant extractor 28 and the liquid pollutant extractor 17. The System is very simple in manufacturing and can be fabricated from sheetmetal, plastic or other applicable materials. The special aero-hydrodynamical effect provides a flexibility for the wide range of operating conditions and no servicing. The gas pollutant extractor 28 contains:

gas scrubbing chamber 21 - zigzag shaped gas passage, created by 6, 7, 8,
 intermediate collector 31, created by 3, 4, and 7,
 clarified liquid compartment 19b.

The partition 4 has a conventional mechanically adjustable connection 5 with the guide 7. The combination of partitions 3 and 4 with the guide 7 creates a hydraulic trap in the intermediate collector 31. The 28 has the gas intake 1 and gas exit 2, which are to be ducted according to a design.

The liquid pollutant extractor 17 is a tank open-to-the-atmosphere and divided by the partition 16 on two parts : polluted liquid compartment 18 and clarified liquid compartment 19a.

Make-up liquid float valve 32 with make-up liquid connection 20 are located in 19a, but, as a reasonable option, other liquid feeding means may be employed. The make-up system shall be adjusted on a operating liquid level 25 to maintain the desirable low operating level 29 in 19b.

For a sufficient floats drain the top of the floats' receiver 12a shall be leveled below the static liquid level 24. The adjustment can be done by a conventionally adjustable connection with the dust-grease drain 12. The diffusion control consists of the liquid compensating hood 9, gas static pressure tube 11 and support 10. As shown on FIG. 1 the hood 9 is located in 18, but, as well, it could be placed in 19a. The gas static pressure tube 11 shall be connected with a duct between the gas pollutant extractor and an exhaust fan.

The 28 and 17 are interconnected by the polluted liquid passage 14 and the clarified liquid passage 13, providing recirculation of the working liquid. Both, 28 and 17 have the manual valved drains 15.

THE AERO-HYDRAULIC POLLUTION CONTROL SYSTEM—OPERATION

The operation is based exclusively on the aero-hydrodynamic principles, without any moving parts, with a liquid recirculation constituted by a gas flow, which makes the System most efficient and extremely simple in operation, maintenance and fabrication. The System is to be properly installed, horizontally leveled, filled with liquid at the desirable static level 24, and connected to the exhaust fan and local exhausts by ducts, according to the design. When an operation is instituted, the level drops on the inlet side 1 and in the exractor 17, but rises in the collector 31 and in the hood 9, reaching the proper operating level 29 in 19b. The gas cleaning procedure is the combined action of centrifugal force, thorough intermixing of liquid and dust-laden gas, and penetrating liquid curtains. The gas, entering the gas intake 1 and flowing through the gas scrubbing chamber 21 at a high velocity, conveys the liquid along guides 6, 7, and 8, creating strong dynamic liquid flow in the form of films B, C and D. The centrifugal force exerted by rapid changes in direction of flow causes contaminants to penetrate the liquid film and become permanently trapped. Then, the clean gas leaves the System through the gas exit 2. Thus, the exhaust gas, passing through the scrubbing chamber 21, creates for itself the high density liquid films, which perform its purification.

The liquid after the procedure falls down in the intermediate collector 31, and then flows through the circulating passage 14 into the polluted liquid compartment 18 of the open-to-the-atmosphere liquid pollutant extractor 17. Here the liquid is clarified from the pollutant and flows to the clarified liquid compartment 19a of the 17, then, through the clarified liquid passage 13 to the clarified liquid compartment 19b of the gas pollutant extractor 28 for a next gas cleaning cycle. This is a repeatedly continuous liquid recirculating cycle during an entire time of the System functioning.

The configuration of the guide 7, beside having a smooth surface for forming liquid film A and C, creates a space—the intermediate collector 31 for polluted liquid, coming after gas cleaning cycle. In the present invention the partition 3 creates a overflow slot with a hydraulic trap, along of an entire length of the gas pollutant extractor 28, and aerodynamically directs a gas flow. This feature performs two functions: a control of the high operating liquid level in 31, and an overflow, which creates a liquid flow A for prewashing the polluted gas upon entry into the gas pollutant extractor before it impinges against the guide 7 and liquid bath. An adjustment of prewashing can be implemented by means of the conventional mechanically adjustable connection 5 of the guides 7 and 4, or without 4 and 5, when it is fabricated for predetermined conditions. The collector 31 has one or more exits 14a, connecting by 14 with 18.

The open-to-the-atmosphere liquid pollutant extractor 17 allows an easy access for adjusting and maintaining devices 9, 12a, 16 and 32, and for various ways of pollutants handling. A quiet and laminar liquid flow assists in clearing the liquid from pollutants. The 17 especially beneficial for a floating type of pollutants such as : grease-laden cooking vapors, residues, paint aerosol, textile dust, etc.

The diffusion control functions are:

preventing a diffusion of gases or flame through the gas pollutant extractor 28 and exhaust ducts to the atmosphere when the System is not operating, providing an emergency smoke removal and flame suppression, immediately upon entry, in operating time.

originating the low operating liquid level for the System operation, providing static pressure feedback control to stabilize a desired amount of the gas flow in spite of unexpected fluctuations of the flow resistance in the exhaust system.

compensating an evaporated liquid in an emergency case, such as the liquid make-up system failure during an operation.

Figure 1:
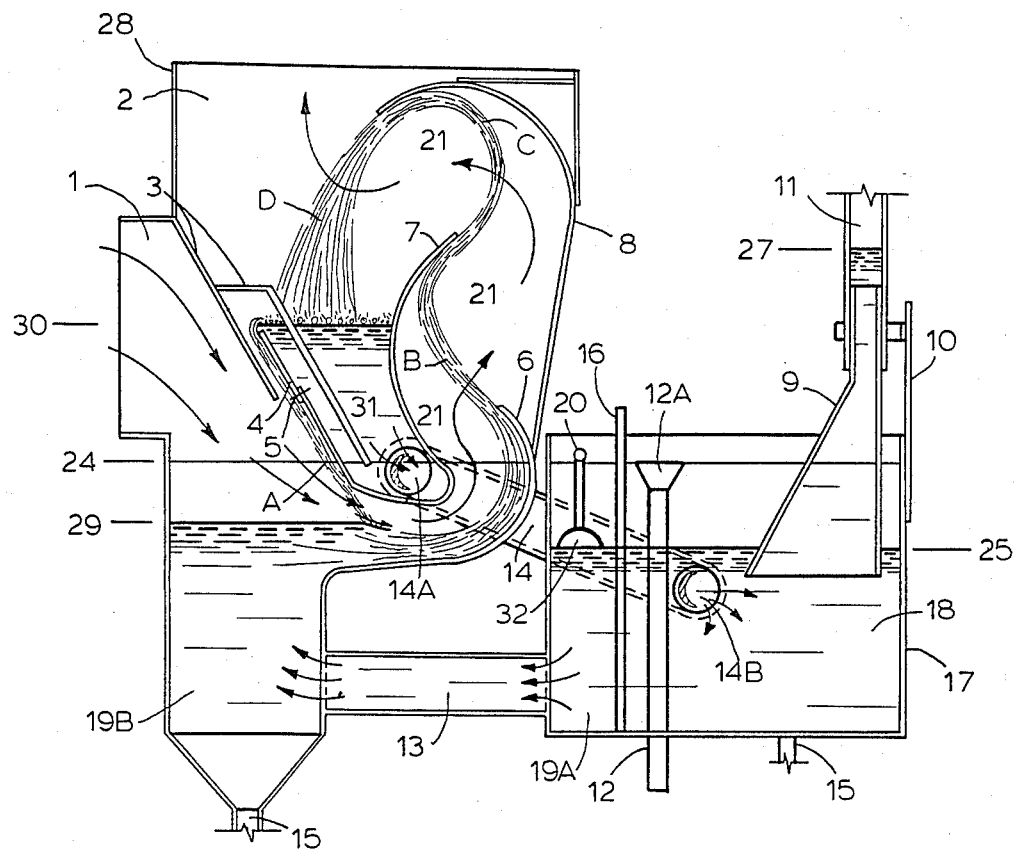
FIG. 1 shows a cross-sectional view of the entire Aero-Hydraulic Pollution Control System illustrating a purification procedure according to the invention.
Figure 2:
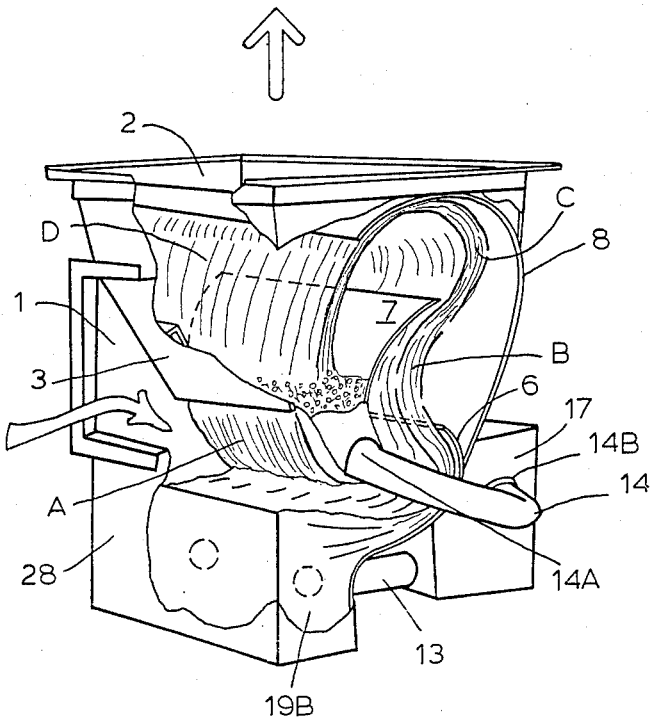
FIG. 2 shows a perspective view of the Aero-Hydraulic Pollution Control System illustrating a purification procedure according to the invention. The side wall and a part of the front wall are cut for a clearity of the picture.

The cross-sectional view in FIG. 1 demonstrates the system in operation. The hood 9 is submerged in the liquid bath 18 and filled up to the high operating liquid level 27. This liquid compensating volume shall be adequate to constitute a hydraulic trap (siphon) in 19b and 31, preventing a diffusion of gases or flame through the gas pollutant extractor and exhaust ducts to the atmosphere when the System is not operating, and to originate a desired low operating liquid level 29 in 19b, not imposing an additional gas resistance during the System operation. On FIG. 1, 4 and 5 the hood 9 is shown in a cone form with the upward top. The adjusting procedure of a compensating liquid volume is submerging or lifting the hood 9. The more the hood 9 is submerged, the less are the compensating volume of the liquid in 9 and higher the low operating liquid level 29 in the 19b, and vice versa. The hood 9 can be any practically acceptable shape, and, accordingly, the adjusting procedure will depend of the shape. A fluctation of the gas flow resistance in ducts immediately changes the negative static pressure of the system fan. Consequently, the vacuum in the gas static pressure tube 11 will affect an amount of liquid in the compensating hood 9. Thus, the more resistance to the gas flow in ducts, the more liquid is induced in the hood 9, the less resistance in the gas scrubbing chamber 21, and vice versa. This is the static pressure feedback control. On FIG. 1, the make-up liquid piping connection 20 with the conventional float valve 32 are shown in the compartment 19a. A control of the low operating liquid level 29 is provided by the start-up adjustment of the valve 32 on the low operating liquid level 25. As an option, the float valve 32 can be placed in an out-of-gas-flow pocket in the compartment 19b (this conventional option is not shown on drawings). For adequate clearing the working liquid and extracting the trapped dust, grease, lint, etc, the partition 16 in the collector 17 has several options, shown on FIGS. 6a, 6b, and 6c. These options are furnished according to properties of pollutants. Thus, FIG. 6a demonstrates the option for dust with a greater specific weight than the working liquid. The partition 16 is a solid sheet of a metal, plastic or other applicable material. The extension of 16, from the bottom of 17 to an adequate elevation below operating level 25, allows liquid to overflow from 18 to 19a. This liquid, clarified of the pollutant, flows to the gas pollutant extractor 28 for a next cycle. The pollutant 26a, settled on the bottom of the 18, can be removed and disposed by any conventional way. FIG. 6b demonstrates the option with dust, grease or paint, or other pollutants, emerging on the surface of the working liquid in 18. The partition 16 can be of the same material as in the previous option. The location of 16 will be different. The bottom edge of 16 shall be placed above the bottom of 17 to provide a pass for the clarified liquid from 18 to 19a. It shall be adjusted to prevent the pollutant penetration from 18 to 19a. The top edge of 16 shall prevail above the static liquid level 24, causing a collection of the emergency pollutant 26b. Removing 26b can be done by any conventional way, but the invention offers the hydraulically instrumented drain 12, which will be discussed later. The option, shown on FIG. 6c, would be suitable for pollutants with an approximately equal, to the liquid, specific weight, i.e. pollutants' particles, floating on all levels of 18. The partition 16 is shown in the full height, from the bottom to the top of 17. In this case, 16 shall be of materials with efficient screening or filtering capabilities. The liquid will penetrate from 18 to 19a, but pollutants shall settle on the screened partition 16. Removing and disposing can be done conventionally. On FIG. 7 is shown the option of extracting pollutants from the polluted liquid flow through the elevated end 14b which is equipped with a screened filter 34.

The main problem, which has deprived presently available wet type dust arresters from being used for light dust, grease or paint, is mechanical and operational difficulties of the floats removal. The present invention offers several original options for the hydraulically operated floats removal devices. On FIGS. 3a, 3b, 3c and 3d are shown the options of the compartment 18, equipped for removing dust, grease or paint, or other pollutants, emerging on the surface of the liquid in 18. Options of FIGS. 3a, 3b and 3c implement the principle of the hydraulically instrumented floats drain 12 with receiver 12a. The FIG. 3a; illustrates an application of piping for 12, which can be connected or directed to a desirable floats disposal features. The receiver 12a can be of any convenient shape: circle, square, etc. The connection of 12a with 12 is adjustable by means of any conventional way (for example, by means of a compensating threaded connection or a rubber receiver 12a with sliding watertight means along the pipe 12). The top level of 12a is adjusted on the desired static liquid level 24. In this case, the hood 9 to be adjusted to extract a larger liquid volume than is required for originating the low operating level 29. In the process of initiating the System operation, the make-up float valve 32, adjusted on the level 25, shall add a compensating amount of the liquid to remain the level 29. A spare volume of the liquid in the hood 19 will cause an overflow 23 of the emerged pollutants 26b through the receiver 12a when the operation is terminated. Thus, the collected floats will be automatically drained each time when the operation is terminated. In this case the drain 12 simultaneously controls the static level 24. This the principle of the hydraulically automated floats removal. Also, the collected floats 26b can be manually removed from the liquid surface of the 17 even while the System is working (no need to stop the operation for purpose of removing the floats). The FIGS. 3b and 3c illustrate optional structural applications:

12a can be a drain pocket, created with a sloped piece of sheet metal (or other applicable materials) inside 18 and a hole in the side wall of 18 to the disposal compartment 37 (FIG. 3b), the same type drain receiver 12a, but with drain pipe 12, directing floats in the separate disposal can 38 (FIG. 3c).

The FIG. 3d demonstrates a different approach. This employs the floats compactor 35, a sheet metal (or other applicable materials) bottomless box with handles 36 on the top, resting on the supporting frame 39. As the practice has shown, some types of floats (for instance paint) are intended to emerge and coagulate. Thus, floats, collected in 35, will be pressed by the liquid in some kind of foam mat. This provides a most sufficient floats removal and solves disposal problems.

The clarified liquid passage by means of piping 13, interconnecting the gas pollutant extractor 28 and the liquid pollutant extractor 17, allows a flexible mounting layout (relatively to each other), or connecting several dust arresters to one liquid pollutant extractor and vice versa.

The polluted liquid passage 14 has different options for connecting to the gas pollutant extractor 28 and the liquid pollutant extractor 17:

On the FIG. 7 is shown the polluted liquid entrance 14b, disconnected from 17 and elevated on a desirable level above the dynamic liquid level 25 in the liquid pollutant extractor 17. This can provide an open gravitational flow of the polluted liquid. If 14b is equipped with a desirable type of filter 34 some kinds of pollutants will be extracted. In this case, another end 14a shall be connected at the lowest level of the intermediate collector 31. The top of 14 shall have an gas vent 34. In addition, this option provides a hydraulic trap 24a in the intermediate collector 31, replacing functions of 14a, which is shown on the FIG. 8.

FIG. 8 illustrates placing the polluted liquid exit 14a on desirable level in 31. This creates a hydraulic trap in the intermediate collector 31, providing the fire suppression and preventing a diffusion of vapors through 31 and exhaust ducts to the atmosphere (when the System is not operating). This replaces the function of 14b on the FIG. 7. In addition, the arrangements enable to achieve a desirable dynamic liquid level 30 in the intermediate collector 31 to provide overflow for prewashing. This replaces the function of the adjustable mechanical connection 5 in the overflow passage.

Although certain preferred embodiments of this invention have been illustrated and described, it will be evident that other embodiments may exist and various changes made without departing from the spirit and scope of this invention. All features of the present invention (except the intermediate collector 31 with gas prewashing) can be applicable for the Air Cleaner, U.S. Pat. No. 2,373,330, dated Apr. 10, 1945. The same applications are shown on FIGS. 9a and 9b with omitted 9, 16, 32, 12, 15 etc. in order to avoid crowded drawings. On the FIG. 9a you can see the principal provision for the liquid circulation through the open liquid pollutant extractor 17. The liquid passage 14 is shown as a pipe and the liquid passage 13 as a hole. On the FIG. 9b the liquid passages 13 and 14 are shown as pipes. It is possible to have other features of the liquid passages, based on the main principle of the invention. The original feature of the invention can be used for cooling or/and humidifying exhaust gases, as well as for a heat recovery from a working liquid. The invention can be used for dual purpose as an air pollution control and as an element of a technological process, where gas or dust soluble in a liquid could create a new product. For instance: a sugar powder and water produce a syrup, or a soap powder and water produce a liquid soap, etc. The aero-hydraulic pollution control system could be setup without optional overflow and diffusion control provisions.

I claim:

1. A system for gas and water pollution control, and sludge handling, based exclusively on the aerohydrodynamic principles and without any moving parts, filled up to desired static level with a liquid, which becomes a cleaning and flame suppression media as a result of said liquid recirculation constituted by said gas flow, comprising:

a liquid pollutant extractor, open to the atmosphere and easily accessible for manual sludge removal and service in operating and unoperating time, a gas pollutant extractor, interconnected by polluted and clarified liquid circulating passages with said liquid pollutant extractor, preventing entrapped pollutants from reentering said gas pollutant extractor, said circulating passages, hydraulically connecting high and low operating liquid levels of said gas pollutant extractor through said liquid pollutant extractor, delivering a trapped pollutant into said liquid pollutant extractor for extracting it from said circulating liquid, means for implementing said system to the dual purpose as an air pollution control and as an element of a technological process, where pollutant soluble in a liquid creates a new product.

2. The invention of claim 1 wherein said circulating passages contain means for:

connecting more than one gas pollutant extractor to said liquid pollutant extractor, providing a flexible layout of the liquid pollutant extractor relatively to the gas pollutant extractor for an easier adaptation to an available for installation space.

3. The invention of claim 1 wherein the polluted liquid passage means, connected to the gas pollutant extractor on different horizontal levels, instituting:

a hydraulic trap in an intermediate collector, a prewash of entering contaminated gas before the gas impinges the liquid bath.

4. The invention of claim 1 wherein the polluted liquid passage means, disconnected from the liquid pollutant extractor and leveled to a desirable level above the operating liquid level of the liquid pollutant extractor, constituting:

an open, gravitational flow to the liquid pollutant extractor through an attached filter, a control of high operating liquid level in an intermediate collector.

5. The invention of claim 1 wherein the liquid pollutant extractor includes a receiver with adjustable connection to a drain passage, providing:

a hydraulically automated disposal, based on the difference of unoperating and low operating liquid levels of the liquid pollutant extractor, thus, floats collected on the liquid surface will be automatically drained each time when operation of the system is terminated, avoiding an entire drainage of the system, an emergency overflow, if the float valve makeup fails.

6. The invention of claim 1 wherein the liquid pollutant extractor comprises:

a floats compactor which is a sheet metal, or other applicable materials, bottomless box with handles, resting on a supporting frame in a polluted compartment of the liquid pollutant extractor, a means, based on the difference of unoperating and low operating liquid levels of the liquid pollutant extractor, for converting a floating pollutant, collected under the top of said floats compactor, in a pressed foam mat, which can be removed in operating and unoperating time without draining the system.

7. The invention of claim 1 wherein the liquid pollutant extractor comprises:
polluted and clarified compartments,
adjustable and removable sheet metal, metal mesh, and of other applicable materials partitions, creating said compartments and separating the diving, floating and buoying particles from the polluted liquid.

8. A diffusion control, based exclusively on the aerohydrodynamic principles without any moving parts or mechanisms by means of direct communication between the liquid bath of the liquid pollutant extractor and the suction side of the exhaust fan, comprising:
a compensating hood, having a suitable form and volume for a desirable case, submerged in the liquid of the liquid pollutant extractor at the desirable level,
a static pressure tube, interconnecting said compensating hood with a downflow suction duct in vicinity of the exhaust fan,
a support for adjustment of said compensating hood.

9. The invention of claim 8 wherein said diffusion control contains means for constituting:
a liquid trap in the gas pollutant extractor, preventing gases and flame diffusion through the gas pollutant extractor and exhaust ducts to the atmosphere in unoperating time,
a desired operating liquid level in the gas pollutant extractor, by extracting an adequate volume of the liquid in said compensating hood, not imposing an additional resistance to the gas flow.

10. The invention of claim 8 wherein said diffusion control contains means for providing a static pressure feedback control to stabilize a desired amount of the gas flow in spite of unexpected fluctuations of the flow resistance in the exhaust system.

11. The invention of claim 8 wherein said diffusion control contains means for providing liquid compensation in a case when the float valve makeup fails.

12. The invention of claims 1 and 8 wherein said liquid pollutant extractor, circulating passages and diffusion control as parts for improving other known gas purifying units wherein the gas passes downwardly through an inlet side and impinges against a liquid bath.

13. An intermediate collector of said gas pollutant extractor, taking-in a whole volume of the contaminated liquid after gas purifying treatment, to prevent its reentry in the next gas purifying cycle before it will be clarified in the liquid pollutant extractor, comprising:
an overflow slot with a hydraulic trap, along of an entire length of the gas pollutant extractor, for preventing a gas and flame penetration through said slot,
an adjustable guide, which controls a high operating level of the polluted liquid in said intermediate collector, providing an efficient intensity liquid overflow.

14. The invention of claim 13 wherein the overflow slot contains means for directing the entering gas to be prewashed and, then, to be impinged against the liquid bath of the gas pollutant extractor.

15. The invention of claim 13 wherein said overflow contains means for prewashing of the contaminated gas upon entry to the gas pollutant extractor before the gas impinges against the liquid bath.

* * * * *